(12) United States Patent
Kester et al.

(10) Patent No.: US 7,003,971 B2
(45) Date of Patent: Feb. 28, 2006

(54) ELECTRONIC COMPONENT COOLING SYSTEM FOR AN AIR-COOLED CHILLER

(75) Inventors: Douglas Alan Kester, York, PA (US); Harold Robert Schnetzka, York, PA (US); Mustafa Kemel Yanik, York, PA (US); John F. Judge, Stewartstown, PA (US); Mahesh Valiya Naduvath, Lutherville, MD (US); Frank Highland Hill, IV, York, PA (US)

(73) Assignee: York International Corporation, York, PA (US)

( * ) Notice: Subject to any disclaimer, the term of this patent is extended or adjusted under 35 U.S.C. 154(b) by 0 days.

(21) Appl. No.: 10/822,460

(22) Filed: Apr. 12, 2004

(65) Prior Publication Data

US 2005/0223730 A1 Oct. 13, 2005

(51) Int. Cl.
*F25D 23/12* (2006.01)

(52) U.S. Cl. ............... 62/259.2; 62/333; 165/80.4; 165/104.33; 361/699

(58) Field of Classification Search ........... 62/230, 62/259.2, 305, 404, 407, 333; 165/80.4, 165/104.33, 104; 361/699
See application file for complete search history.

(56) References Cited

U.S. PATENT DOCUMENTS

| 3,950,369 | A | * | 4/1976 | Gent ................. 518/705 |
| 4,190,105 | A | | 2/1980 | Dankowski |
| 4,742,472 | A | * | 5/1988 | Sugimori et al. ......... 700/269 |
| 5,036,677 | A | | 8/1991 | Neuenfeldt et al. |
| 5,168,919 | A | | 12/1992 | Berenholz et al. |
| 5,323,847 | A | * | 6/1994 | Koizumi et al. ....... 165/104.33 |
| 5,339,214 | A | * | 8/1994 | Nelson .................. 361/695 |
| 5,365,749 | A | | 11/1994 | Porter |
| 5,646,825 | A | * | 7/1997 | Huttenlocher et al. ...... 361/699 |
| 5,655,381 | A | | 8/1997 | Huttenlocher et al. |
| 5,682,757 | A | * | 11/1997 | Peterson .................. 62/259.2 |
| 5,731,954 | A | * | 3/1998 | Cheon .................... 361/699 |
| 6,089,797 | A | * | 7/2000 | Chen et al. .................. 408/8 |
| 6,134,109 | A | | 10/2000 | Muller et al. |
| 6,171,380 | B1 | * | 1/2001 | Wood et al. ............... 96/386 |
| 6,205,803 | B1 | | 3/2001 | Scaringe |
| 6,288,895 | B1 | * | 9/2001 | Bhatia .................... 361/687 |
| 6,341,492 | B1 | | 1/2002 | Carey |
| 6,351,381 | B1 | | 2/2002 | Bilski et al. |
| 6,438,984 | B1 | | 8/2002 | Novotny et al. |
| 6,462,949 | B1 | | 10/2002 | Parish, IV et al. |
| 6,467,295 | B1 | | 10/2002 | Oh et al. |
| 6,628,520 | B1 | | 9/2003 | Patel et al. |

(Continued)

FOREIGN PATENT DOCUMENTS

DE 33 03 636 A1 8/1984

(Continued)

*Primary Examiner*—Mohammad M. Ali
(74) *Attorney, Agent, or Firm*—McNees Wallace & Nurick LLC (57) ABSTRACT

A chiller system includes a refrigerant loop, the refrigerant loop further including a compressor, an air-cooled condenser arrangement and an evaporator arrangement connected in a first closed refrigerant loop. A motor is connected to the compressor to drive the compressor, a drive is connected to the motor to power the motor and a power/control panel controls the refrigerant loop. The power/control panel and the condenser arrangement are connected in a second closed coolant loop. The second closed coolant loop provides cooling to the enclosure and/or components within the enclosure disposed on a chill plate. Condensation is substantially prevented from forming inside the enclosure, despite the enclosure lacking a humidity control device.

18 Claims, 5 Drawing Sheets

U.S. PATENT DOCUMENTS

| | | |
|---|---|---|
| 6,651,452 B1 | 11/2003 | Lecke et al. |
| 6,705,101 B1 * | 3/2004 | Brotz et al. .................... 62/198 |
| 6,714,413 B1 * | 3/2004 | Ghosh et al. ................ 361/700 |
| 6,722,151 B1 * | 4/2004 | Spinazzola et al. ......... 62/259.2 |
| 6,725,682 B1 * | 4/2004 | Scott ......................... 62/259.2 |
| 6,898,942 B1 * | 5/2005 | Schanin ........................ 62/158 |
| 2002/0116933 A1 | 8/2002 | Chu et al. |
| 2003/0147214 A1 | 8/2003 | Patel et al. |
| 2003/0147216 A1 | 8/2003 | Patel et al. |
| 2004/0257840 A1 * | 12/2004 | Brasz et al. .................. 363/34 |

FOREIGN PATENT DOCUMENTS

| | | |
|---|---|---|
| EP | 1 336 518 A | 8/2003 |
| JP | 56-146942 A * | 11/1981 |
| JP | 01 266471 A | 10/1989 |
| JP | 4 369352 A | 12/1992 |
| JP | 11 023075 A | 1/1999 |
| WO | WO 02/13588 A1 | 2/2002 |
| WO | WO 02/086968 A2 | 10/2002 |
| WO | WO 03/083631 A1 | 10/2003 |

* cited by examiner

ELECTRONIC COMPONENT COOLING SYSTEM FOR AN AIR-COOLED CHILLER

BACKGROUND OF THE INVENTION

The present invention relates generally an electronic component cooling system. More specifically, the present invention relates to a cooling system for electronic power and/or control components of an air-cooled chiller system.

Electrical components associated with the electronic powering of a chiller system generate a great deal of heat in operation. Since these components are typically housed in a compact enclosure that is substantially sealed against exposure to the elements, the heat generated within the enclosure by the power electronic components must be dissipated to avoid damaging the components. Power electronic semiconductor components in the enclosure that generate especially large amounts of heat during operation are typically cooled using a chill plate. The chill plate is composed of a material having high thermal conductivity and includes internal channels, which constitute a portion of a heat transfer fluid loop that circulates a working fluid or refrigerant fluid to cool the electrical components. The working fluid that flows through the heat transfer fluid loop is placed in a heat exchange relationship with the chill plate channels to remove thermal energy from the chill plate. The heat transfer fluid loop can be part of a separate cooling system for the enclosure to dissipate the thermal energy from the chill plate. The heat transfer fluid loop can also be incorporated into the chiller system as part of the refrigeration loop or as part of a condenser fluid loop. The electrical components are mounted on the exterior of the chill plate, with the chill plate drawing thermal energy from the electrical components by thermal conduction. Thermal energy transferred to the chill plate is then transferred by convection to the working fluid that flows in the channels of the fluid loop.

Other electrical components housed in the enclosure generate a reduced amount of thermal energy in operation such that a chill plate is not required. For these components, an additional heat transfer fluid loop, similar to that as described above, extends into the substantially closed space of the enclosure in combination with a fan operating inside the enclosure to circulate air inside the enclosure for achieving heat dissipation. However, condensation may form inside the enclosure when the temperature of the working fluid in the heat transfer fluid loop is less than the dew point temperature inside the cabinet. Condensation is undesirable, as it can damage the electrical components. To prevent the formation of condensation, a separate temperature monitoring and control system is then required that prevents the inside temperature of the enclosure from reaching a level that is less than the dew point temperature.

Therefore, what is needed is a cooling system for the electrical components situated in an electrical enclosure of a chiller system that can substantially prevent the formation of condensation in the enclosure without requiring a separate temperature monitoring and control system.

SUMMARY OF THE INVENTION

The present invention is directed to a chiller system including a refrigerant loop, the refrigerant loop including a compressor driven by a motor, an air-cooled condenser arrangement having at least one coil and an evaporator arrangement connected in a first closed refrigerant loop. An electrical/electronic power control panel provides electrical power to and/or controls the operation of the refrigerant loop. The power/control panel encloses the electrical/electronic power/control components and includes a cooling system to cool the components, the cooling system being in fluid communication with the at least one coil of the air-cooled condenser arrangement.

The present invention is further directed to a power/control panel for controlling the operation of a chiller system having a refrigerant loop, the refrigerant loop including a compressor driven by a motor, an air-cooled condenser arrangement having at least one coil and an evaporator arrangement connected in a first closed refrigerant loop. The power/control panel includes a substantially closed enclosure having a plurality of components therein. The enclosure is in fluid communication with the at least one coil of the air-cooled condenser arrangement.

One advantage of the present invention is a reduction of the number of components, as the cooling system for the power/control panel is incorporated into the chiller system.

Another advantage of the present invention is that it substantially prevents the formation of condensation in the power/control panel.

Still another advantage of the present invention is that it does not require a separate temperature monitoring and control system.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
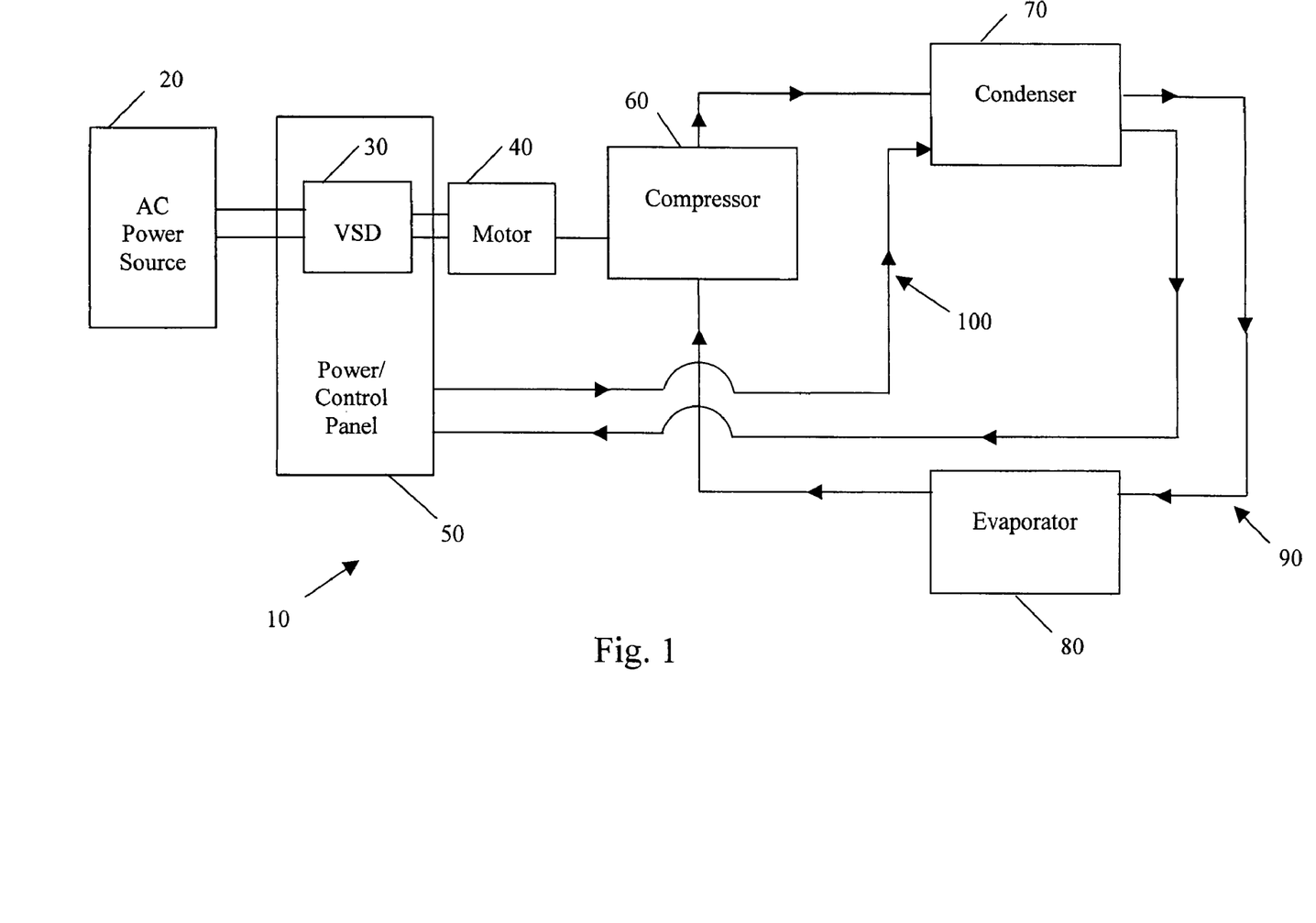
FIG. 1 illustrates schematically one embodiment of a refrigeration system that can be used with the present invention.

FIG. 1 illustrates generally the system configuration of the present invention. A chiller system 10 includes an AC power source 20 that supplies a combination variable speed drive (VSD) 30 and power/control panel 50, which powers a motor 40 that drives a compressor 60, as controlled by the controls located within the power/control panel 50. In one embodiment of the invention, all of the components of the VSD 30 are contained within the power/control panel 50. The AC power source 20 provides single phase or multiphase (e.g., three phase), fixed voltage, and fixed frequency AC power to the VSD 30 from an AC power grid or distribution system that is present at a site. The compressor 60, condenser 70 and evaporator 80 define a first closed refrigerant loop 90. The compressor 60 compresses a refrigerant vapor and delivers the vapor to the condenser 70 through a discharge line. The compressor 60 can be any suitable type of compressor, e.g., centrifugal compressor, reciprocating compressor, screw compressor, scroll compressor, etc. The refrigerant vapor delivered by the compressor 60 to the condenser 70 enters into a heat exchange relationship with air surrounding the condenser 70 and circulated through the condenser 70, and undergoes a phase change to a refrigerant liquid as a result of the heat exchange relationship with the surrounding ambient air. The condensed liquid refrigerant from the condenser 70 flows through an expansion device (not shown) to the evaporator 80. A fluid circulated in heat exchange relationship with the evaporator 80 in the first closed refrigerant loop 90 can then provide cooling to an interior space. Similarly, a portion of the condenser 70 and the power/control panel 50 define a second closed coolant loop 100 that provides cooling to components housed in the power/control panel 50.

It is noted that the chiller system 10 of the present invention may use a plurality of any combination of VSDs 30, motors 40, compressors 60, condensers 70, and evaporators 80.

The power/control panel 50 can include a variety of different components such as an analog to digital (A/D) converter, a microprocessor, a non-volatile memory, and an interface board, to control operation of the chiller or refrigeration system 10. The power/control panel 50 can also be used to control the operation of the VSD 30, the motor 40 and the compressor 60. The refrigeration system 10 includes many other features that are not shown in FIG. 1. These features have been purposely omitted to simplify the drawing for ease of illustration.

Figure 2:
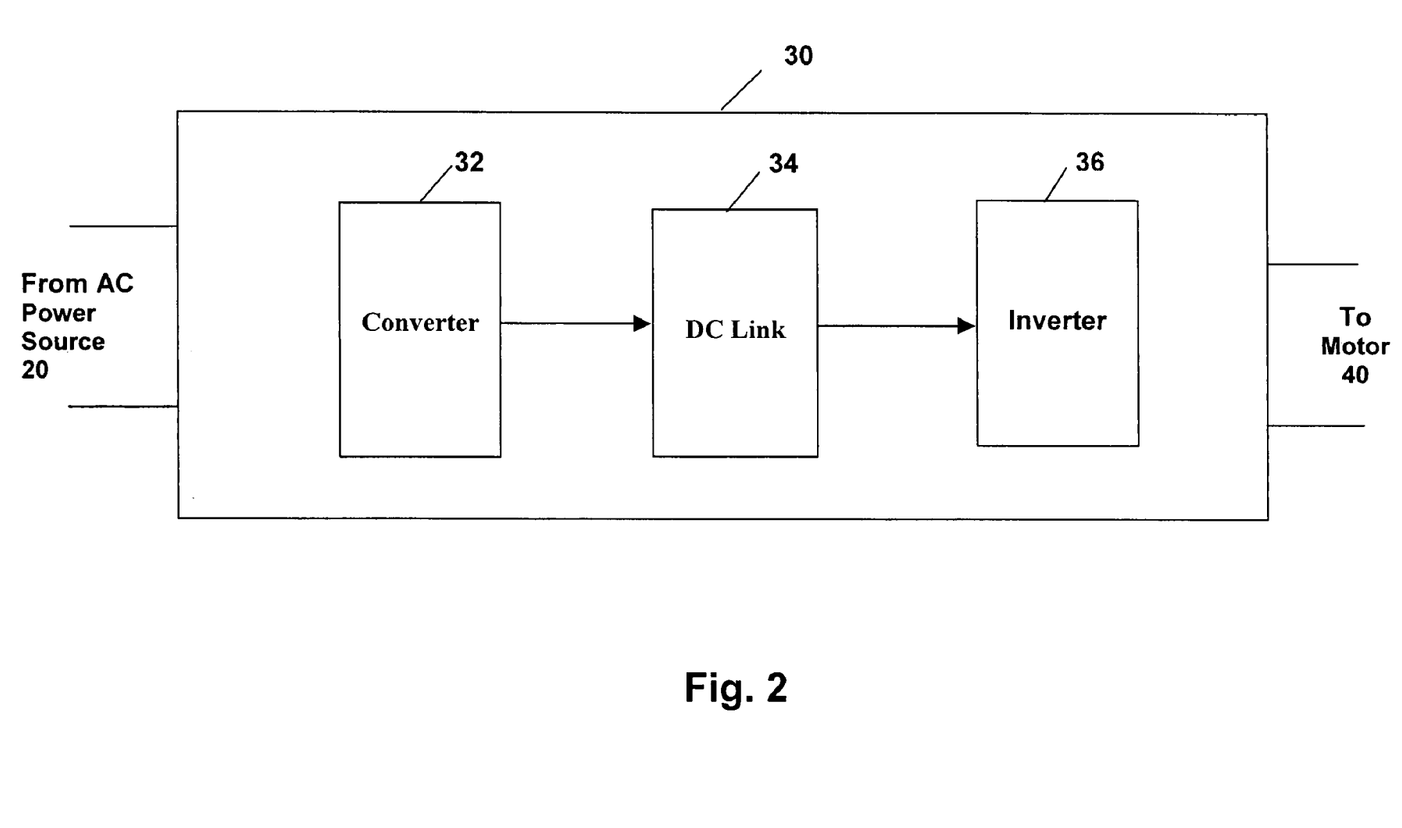
FIG. 2 illustrates schematically one embodiment of a VSD usable with the present invention.

The VSD 30 receives AC power having a particular fixed line voltage and fixed line frequency from the AC power source 20 and provides AC power to the motor 40 at a desired voltage and desired frequency, both of which can be varied to satisfy particular requirements. Preferably, the VSD 30 can provide AC power to the motor 40 having higher voltages and frequencies and lower voltages and frequencies than the rated voltage and frequency of the motor 40. FIG. 2 illustrates schematically some of the components in one embodiment of the VSD 30. The VSD 30 can have three stages: a converter stage 32, a DC link stage 34 and an inverter stage 36. The converter 32 converts the fixed line frequency, fixed line voltage AC power from the AC power source 20 into DC power. The DC link 34 filters the DC power from the converter 32 and provides energy storage components such as capacitors and/or inductors. Finally, the inverter 36 converts the DC power from the DC link 34 into variable frequency, variable voltage AC power for the motor 40.

The particular configurations of the converter 32, DC link 34 and inverter 36 are not critical to the present invention so long as the VSD 30 can provide appropriate output voltages and frequencies to the motor 40. For example, the converter 32 can be a diode or thyristor rectifier coupled to a boost DC/DC converter to provide a boosted DC voltage to the DC link 34 in order to obtain an output voltage from the VSD 30 greater than the input voltage of the VSD 30. In another example, the converter 32 can be a diode or thyristor rectifier supplied by an auto-transformer and inductor. In another example, the converter 32 can be a pulse width modulated boost rectifier having insulated gate bipolar transistors (IGBTs) to provide a boosted DC voltage to the DC link 34 to obtain an output voltage from the VSD 30 greater than the input voltage of the VSD 30. In a preferred embodiment of the present invention, the VSD 30 can provide output voltages and frequencies that are at least twice the rated voltage and frequency of the motor 40. Furthermore, it is to be understood that the VSD 30 can incorporate different components from those shown in FIG. 2 so long as the VSD 30 can provide the motor 40 with appropriate output voltages and frequencies.

The VSD 30 can prevent a large inrush current from reaching the motor 40 during the startup of the motor 40. The converter 32 of the VSD 30 can provide the AC power source 20 with power having about a unity power factor. Finally, the ability of the VSD 30 to adjust both the output voltage and output frequency to the motor 40 permits the VSD 30 to be operated on a variety of foreign and domestic power grids without having to alter the motor 40 or the compressor 60 for different power sources.

The motor 40 is preferably an induction motor that is capable of being operated at variable speeds. The induction motor can have any suitable pole arrangement including two poles, four poles or six poles. The induction motor is used to drive a compressor 60. The compressor 60 has a variable output capacity that is dependent on the output speed of the motor 40 driving the rotors of the compressor 60. In other words, the output speed of the motor 40 can control the output capacity of the compressor 60. For example, a lower output speed of the motor results in a lower output capacity of the compressor, while a higher output speed of the motor results in a higher output capacity of the compressor.

Referring back to FIG. 1, compressor 60 receives refrigerant vapor at a suction inlet and compresses the refrigerant vapor in the compressor 60. The compressor 60 then discharges the compressed vapor through a discharge line. As discussed above, the output capacity of the compressor 60 is based on the operating speed of the compressor 60, which operating speed is dependent on the output speed of the motor 40 powered by the VSD 30. In the first closed refrigerant loop 90, the refrigerant vapor delivered by the compressor 60 to the condenser 70 enters into a heat exchange relationship with ambient air, i.e., an air-cooled condenser, and undergoes a phase change to a refrigerant liquid as a result of the heat exchange relationship with the air. The condensed liquid refrigerant from condenser 70 flows through an expansion device (not shown) to an evaporator 80.

The liquid refrigerant in the evaporator 80 enters into a heat exchange relationship with a second fluid, e.g., air or water, to lower the temperature of the second fluid, which is then typically used to provide cooling for an interior space. The refrigerant liquid in the evaporator 80 in the first closed refrigerant loop 90 undergoes a phase change to a refrigerant vapor as a result of the heat exchange relationship with the second fluid. The vapor refrigerant in the evaporator 80 exits the evaporator 80 and returns to the compressor 60 by a suction line to complete the cycle for the first closed refrigerant loop 90. It is to be understood that any suitable configuration of evaporator 80 can be used in the chiller system 10, provided that the appropriate phase change of the refrigerant in the evaporator 80 is obtained.

To ensure that the temperature of the working fluid circulating in the second closed coolant loop 100 is not cooled to a temperature that is less than the ambient temperature surrounding the power/control panel 50, a portion of the condenser 70 is used to reject the heat generated within the power/control panel 50. That is, the working fluid from the second closed coolant loop 100 flowing through a plurality of coils or tubes in the condenser 70 is cooled by passing ambient air, or air that is at substantially the same temperature as the air surrounding the condenser 70 such that the temperature of the working fluid cannot be less than the temperature of the ambient air. Therefore, as a practical matter, the temperature of the heated working fluid cannot be lowered to a temperature that is less than the temperature of the passing ambient air, and as such, no monitoring equipment is required.

Figure 3:
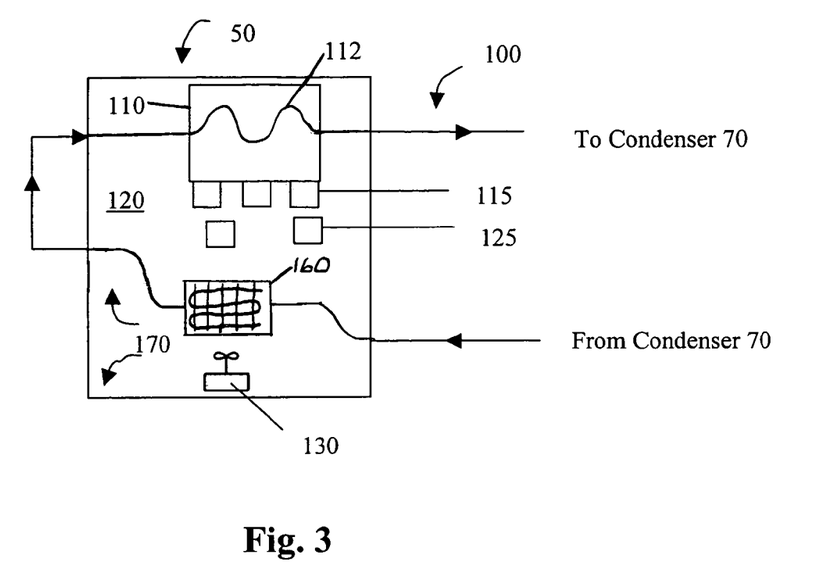
FIG. 3 illustrates schematically one embodiment of a power/control panel construction used in the present invention.

Referring to FIG. 3, the power/control panel 50 defines a substantially closed enclosure 120 for securing power electronic and control components for controlling the operation of the chiller system 10. The enclosure 120 houses a chill plate 110, which is composed of a material having high thermal conductivity and includes internal channels 112 which constitute a portion of the second closed coolant loop 100. Components 115 in the power/control panel 50 that generate significant amounts of heat in a very small area (high power density), such as Power Semi-Conductor devices are disposed on the chill plate 110. Examples of such high power density components include, but are not limited to, Insulated Gate Bipolar Transitors (IGBT's) and Silicon Controlled Rectifiers (SCR's) and diode rectifiers. The thermal energy generated by the components 115 is absorbed by the chill plate 110, due to conduction between the chill plate 110 and the components 115. A working fluid such as a heat transfer fluid or refrigerant fluid circulating in the channels 112 of the chill plate 110 is placed in a heat exchange relationship with the chill plate channels 112 to remove thermal energy from the chill plate 110. The heated working fluid in the second closed coolant loop 100 then returns to condenser 70 to complete the cycle and is placed in a heat exchange relationship with ambient air that is passed through the condenser 70. As previously discussed, the working fluid is cooled to a temperature that is slightly greater than the ambient temperature.

In addition to the chill plate 112, the enclosure 120 of the power/control panel 50 removes thermal energy from components 125 that are disposed in the enclosure 120. The components 125 are generally passive devices that are physically much larger than the active Power Semi-Conductor devices (lower power density) and as such do not necessarily require the enhanced thermal energy reduction capability provided by the chill plate 112. Examples of such lower power density components include, but are not limited to, inductors, resistors, transformers, and central processing unit (CPU) chips. To help remove thermal energy from these low power density components 125, a portion of the second closed coolant loop 100 extends through the enclosure 120. The portion of the second closed coolant loop 100, through which flows the working fluid that is slightly greater than the ambient temperature, is in a heat exchange relationship with the air 170 inside the enclosure 120. To enhance the heat exchange between the air 170 in the enclosure 120 and the portion of the second closed coolant loop 100, a fan or fans 130 is/are also disposed within the enclosure 120 to circulate air 170 inside the enclosure 120.

By maintaining an internal enclosure temperature substantially greater than the surrounding ambient air temperature via the working fluid circulating through the second closed coolant loop 100 that is, in effect, slightly warmer than the ambient air temperature, condensation is effectively prevented from forming inside the enclosure 120. Stated another way, even if the ambient temperature surrounding the enclosure 120 is at dew point, i.e., the temperature at which a vapor (water) begins to condense, the temperature of the air 170 inside the enclosure 120 will always be greater than the ambient temperature, since the electronic power/control components are heating the air within the enclosure 120. Therefore, the cooling construction of the present invention does not require a control device to either monitor or control the humidity level or temperature of the air 170 inside the enclosure 120.

As shown in FIG. 3, the second closed coolant loop 100 includes a serial fluid connection between the outlet side of the condenser 70 and the chill plate 110 and an enclosure air cooling coil 160 located in the power/control panel 50 before returning to the inlet side of the condenser 70 to complete the loop. In other words, the second closed coolant loop 100 extends from the outlet side of the condenser 70, into the enclosure 120, to the inlet side of the channels 112 of the chill plate 110, and connects the outlet side of the channels 112 of the chill plate 110 to the inlet side of the enclosure air cooling coil 160, through the coil 160 and back to the return side of the condenser 70.

Figure 4:
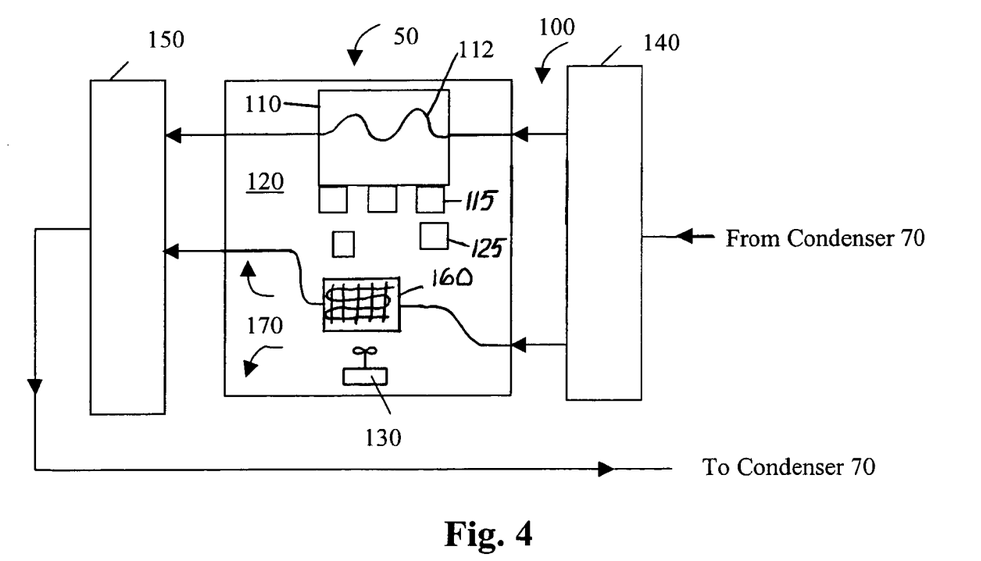
FIG. 4 illustrates schematically another embodiment of a power/control panel construction used in the present invention.

FIG. 4 shows the second closed coolant loop 100 having a parallel connection between the outlet side of the condenser 70 and the two portions of the power/control panel 50 (chill plate 110 and enclosure air cooling coil 160) before returning to the inlet side of the condenser 70 to complete the loop. The second closed coolant loop 100 extends from the outlet side of the condenser 70 to an intake manifold 140 which connects to the inlet sides of both the chill plate 110 and the enclosure air cooling coil 160, connecting the outlet sides of the enclosure air cooling coil 160 and the chill plate 110 to an exhaust manifold 150, and connects the exhaust manifold 150 to the return side of the condenser 70.

It is to be understood that in addition to the possible plumbing arrangements of the second closed coolant loop 100 in FIGS. 3 and 4, it is also possible that each portion of the second closed coolant loop 100 define separate, closed sub-loops. That is, one sub-loop could connect the condenser 70 and the inlet and outlet sides of the enclosure air cooling coil 160, and another sub-loop could connect the condenser 70 and the inlet and outlet sides of the chill plate 110.

Figure 5:
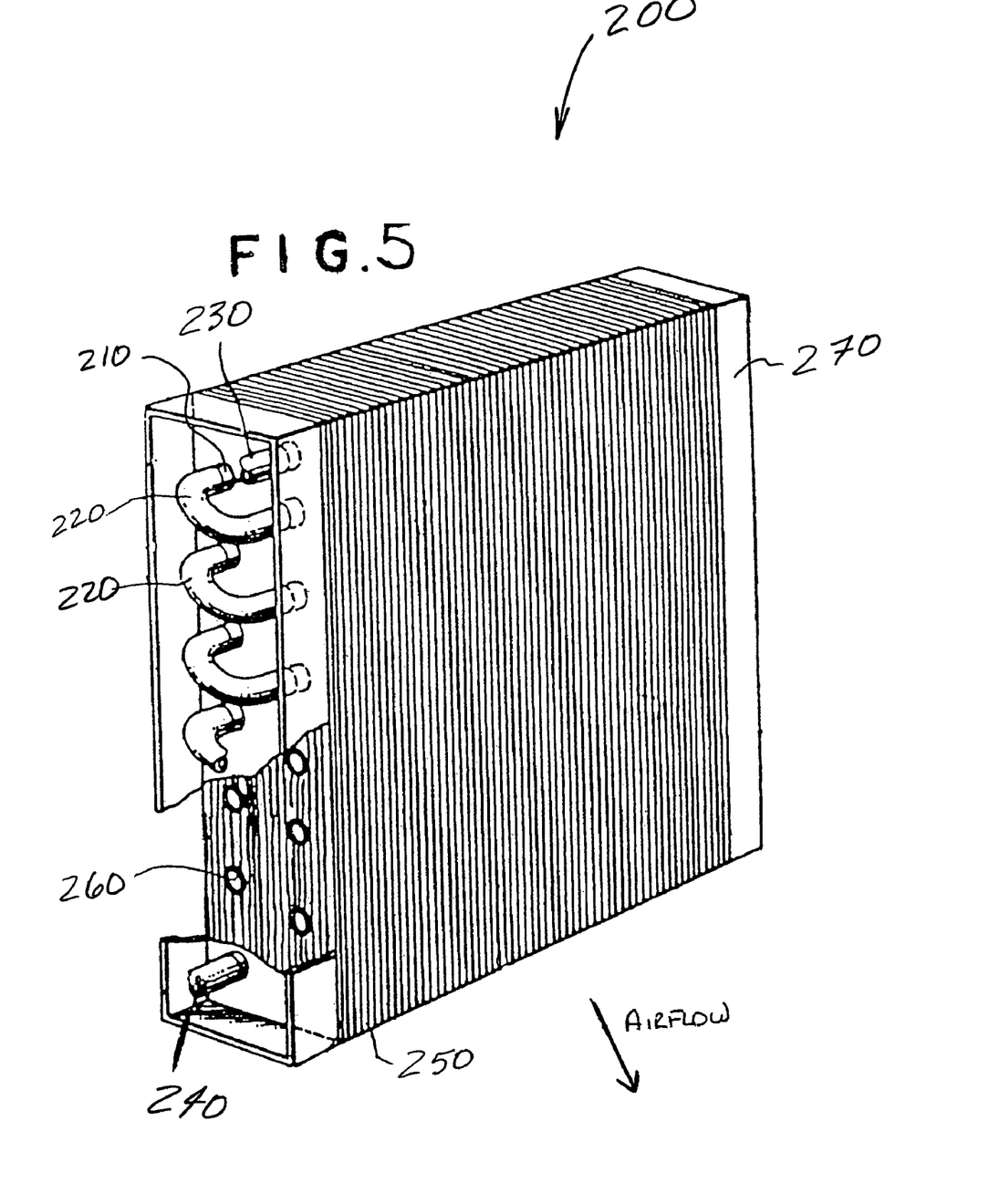
FIGS. 5–6 each illustrate one embodiment of a main condenser coil of an air-cooled chiller system that employs the present invention.

FIG. 5 illustrates one embodiment of a heat exchanger coil assembly 200, usable with the condenser 70 and the enclosure air cooling coil 160. The heat exchanger coil assembly 200 includes a plurality of tubes 210 extending along the length of the coil assembly 200 and arranged in proximity to each other. A plurality of tube connectors 220 connect the ends of a pair of the plurality of tubes 210. Each tube connector 220 has a substantially U-shape and connects an adjacent pair of tubes 210 to provide a serpentine path for fluid flowing through the tubes 210 and tube connectors 220 of the coil assembly 200. One tube 210 of the plurality of tubes 210 is connected to a fluid inlet 230 and another tube 210 of the plurality of tubes 210 is connected to a fluid outlet 240. The fluid inlet 230 and fluid outlet 240 may be located, for example, at the bottom portion of the coil assembly 200, at a side portion of the coil assembly 20 or any other suitable location on the coil assembly 200. The number of tubes 210 and their arrangement and position in the coil assembly 200 can vary depending on the requirements of a specific application. In one embodiment, a row of up to 48 substantially parallel tubes may be provided in the coil assembly 200. More preferably, the coil assembly 200 has two or more substantially parallel rows of up to 12 substantially parallel tubes. The tubes 210 are preferably made of copper, however, other suitable materials may also be used. The tubes 210 have a preselected cross-sectional shape, preferably a round or an oval cross-section.

During the heat transfer process, a first heat transfer fluid flows through the serpentine path formed by the plurality of tubes 210, and a second heat transfer fluid flows over the tubes 210. The plurality of tubes 210 provide an interface for the transfer of heat between the first and second heat transfer fluids. The first heat transfer fluid flowing through tubes 210 is water or a refrigerant fluid such as ammonia, ethyl chloride, Freon®, chlorofluocarbons (CFCs), hydrofluorocarbons (HFCs) and other natural refrigerants. However, it is to be understood that any suitable heat transfer fluid may be used for the first heat transfer fluid. The second heat transfer fluid is preferably air, which is being either warmed or cooled during the heat transfer process depending on the particular application. However, it is to be understood that other suitable heat transfer fluids may be used for the second heat transfer fluid. The airflow is typically forced, such as by a fan, but can be static. Adjacent to the tubes 210 are a plurality of fins 250. The transfer of heat between the first heat transfer fluid and the second heat transfer fluid occurs as the second heat transfer fluid, which is preferably air, flows over or across the tubes 210 and fins 250 of the coil assembly 200, while the first heat transfer fluid flows through the plurality of tubes 210.

The heat exchanger coil assembly 200 has a plurality of fins 250 to improve the heat transfer capabilities of the heat exchanger coil assembly 200. Each fin 250 is a thin metal plate, preferably made of a high conductivity material such as copper or aluminum, and may include a hydrophilic coating. The fins 250 include a plurality of apertures 260 for receiving each of the tubes 210. The tubes 210 preferably pass through the apertures 260 of the fins 250 at preferably a right angle to the fins 250. The tubes and fins 250 make intimate contact with one another to permit heat transfer between the two. While the fins 250 and the tubes can be metallurgically joined such as by brazing or welding, the preferred embodiment of the present invention joins the fins 250 and tubes frictionally or mechanically such as by rolling. The fins 250 are preferably arranged and disposed in a substantially parallel, closely spaced relationship that has multiple paths for the second heat transfer fluid, which is preferably air, to flow between the fins 250 and across the tubes 210. The coil assembly 200 also has end plates 270 that are located on either side of the fins 250 to provide some structural support to the coil assembly 200 and to protect the fins 250 from damage.

Preferably, all of the fins 250 of a single heat exchanger coil assembly 200 have the same dimensions. The dimensions of the fins 250 of a coil assembly 200 can range from less than 1 inch to 40 inches in width and up to 72 inches in height, depending upon the intended use of the heat exchanger coil assembly 200 and the number of tubes 210. The fins preferably have a minimum thickness of about 0.002 inches, to avoid possible manufacturing problems. However, the fins can have a very large thickness if, for example, the whole coil assembly is scaled-up from dimensions of inches to dimensions of feet. In a preferred embodiment, the thickness of the fins are about 0.006 inches, 0.008 inches, and 0.010 inches. With regard to the spacing of the fins, the distances between fins is preferably not less than about 1/30 inch, otherwise there can be manufacturing difficulties. However, the fin pitch can be very large if the whole coil assembly is scaled up as described above. In a preferred embodiment, the fin pitch can arrange from 1/8 inch to 1/14 inch.

Figure 6:
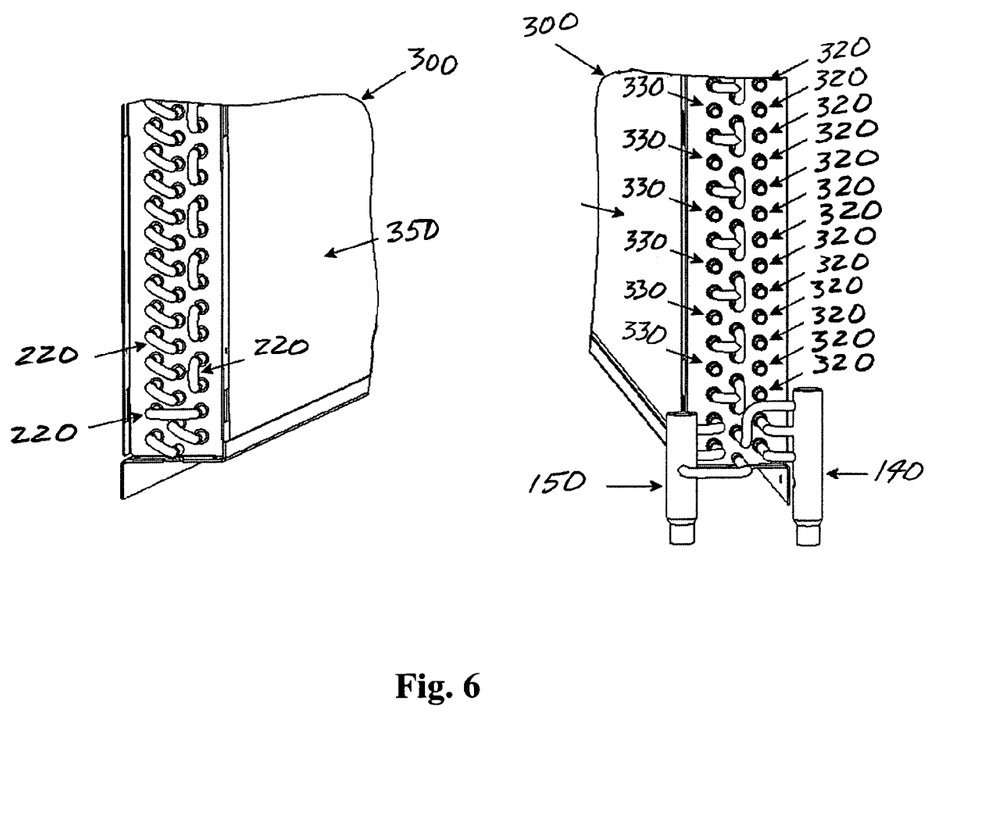

FIG. 6 illustrates one embodiment of an air-cooled chiller condenser coil that utilizes the present invention. A condenser coil 300 comprises a plurality of refrigerant vapor inlets 320 and refrigerant liquid outlets 330. The refrigerant vapor inlets 320 are typically connected by a refrigerant inlet manifold, which is not shown in FIG. 6. Similarly, the refrigerant liquid outlets 330 are typically connected by a refrigerant outlet manifold, which is also not shown in FIG. 6. The coil illustrated in FIG. 6 is circuited in such a manner that two refrigerant inlets 320 feed each refrigerant outlet 330, but it is to be understood that the refrigerant can be passed through the condenser coils in numerous other circuiting patterns. During operation of the air-cooled chiller, superheated refrigerant enters the coil through the refrigerant vapor inlets 320, transfers heat to the air-cooled chiller's ambient air through the coils fins 350, undergoes a phase change from vapor to liquid due to this transfer of heat and then exits the coil as subcooled liquid through the refrigerant liquid outlets 330.

The condenser coil 300 illustrated in FIG. 6 can also cool the coolant of the second closed coolant loop 100 of the power/control panel 50 via the circuits connected to the secondary coolant inlet manifold 140 and secondary coolant outlet manifold 150, as previously discussed. The secondary coolant circuits pass through and are in a heat exchange relationship with the very same fins 350 that the refrigerant circuits pass through and are in a heat exchange relationship with. However, the coil is circuited so that the coolant flowing through the secondary coolant inlet manifold 140 and secondary coolant outlet manifold 150 cannot flow through either the refrigerant vapor inlets 320 or the refrigerant vapor outlets 330. In other words, the coil's secondary coolant circuits are flow-isolated from the coil's refrigerant condensation circuits. Although the secondary coolant circuits illustrated in FIG. 5 are positioned at the very bottom of the coil, it is to be understood that the secondary coolant circuits can be positioned anywhere on the condenser coil.

The condenser 70 is preferably air-cooled, with the first closed refrigerant loop 90 and the second closed coolant loop 100 using separate and independent circuits within the condenser 70. Preferably, the second closed coolant loop 100 uses the lowest or bottom circuits, i.e., the lowermost or bottommost rows of coils, of the condenser 70. The thermal interaction between the refrigerant in the first closed refrigerant loop 90 and the working fluid in the second closed coolant loop 100 is minimized in the preferred arrangement. Next, the preferred arrangement re-allocates to the second closed coolant loop 100, those condenser circuits that receive the lowest air flow, and would be most likely to not be capable of subcooling the refrigerant fluid in the first closed refrigerant loop 90. Finally, this construction simplifies monitoring the amount of working fluid in the second closed coolant loop 100, as a filling level position can be selected that is above any of the remaining portion of the second closed coolant loop 100. Although the refrigerant fluid in the first closed refrigerant loop 90 undergoes a two-phase heat transfer cycle, this is not necessarily the case for the second closed coolant loop 100. The working fluid in the second closed coolant loop 100 can use either a single-phase heat transfer cycle or a two-phase heat transfer cycle.

The second closed coolant loop 100 preferably uses a working refrigerant fluid composition of a propylene glycol—water mixture to cool the power/control panel components 115, 125. While the propylene glycol—water mixture is preferred, it is to be understood that any suitable brine or cooling liquid, such as an ethylene glycol—water mixture, or any suitable two-phase refrigerant, such as R22 or R134a, can be used in the second closed coolant loop 100. Desirable properties for the working fluid include: superior heat transfer properties, low cost to produce, low toxicity and flammability and noncorrosiveness.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A chiller system comprising:
a refrigerant loop, the refrigerant loop comprising a compressor driven by a motor, an air-cooled condenser arrangement having at least one coil and an evaporator arrangement;
a power/control panel for controlling operation of the refrigerant loop, the power/control panel comprising a cooling system to cool components of the power/control panel, the cooling system being in fluid communication with the at least one coil of the air-cooled condenser arrangement; and wherein the cooling system being a separate and distinct circuit from the refrigerant loop.

2. The chiller system of claim 1 wherein tile power/control panel defines a substantially closed enclosure.

3. The chiller system of claim 1 wherein the cooling system has a chill plate having at least one channel.

4. The chiller system of claim 3 wherein at least one component in the power/control panel s disposed on the chill plate.

5. The chiller system of claim 2 wherein the power/control panel includes a fan disposed in the enclosure to circulate air in the enclosure.

6. The chiller system of claim 5 wherein a portion of the cooling system extends inside the enclosure and is disposed in a heat exchange relationship with the fan circulated air.

7. The chiller system of claim 6 wherein at least one component in the power/control panel is cooled by the portion of the cooling system inside the enclosure.

8. The chiller system of claim 1 wherein the first closed refrigeration loop and the cooling system are separate and independent circuits.

9. The chiller system of claim 8 wherein at least one coil of the cooling system is disposed in a lower portion of the air-cooled condenser arrangement.

10. The chiller system of claim 8 wherein the at least one coil at the cooling system is disposed in a lowest, portion or the condenser arrangement.

11. The chiller system of claim 1 wherein the cooling system comprises an ethylene-glycol and water mixture.

12. The chiller system of claim 1 wherein the cooling system comprises a propylene-glycol and water mixture.

13. The chiller system of claim 1 wherein the cooling system comprises a two-phase refrigerant.

14. The chiller system of claim 13 wherein the two-phase refrigerant is R22.

15. The chiller system at claim 13 wherein the two-phase refrigerant is R134a.

16. The chiller system of claim 1 wherein the cooling system is configured to substantially prevent formation of condensation inside the power/control panel.

17. A power/control panel for controlling the operation of a chiller system having a refrigerant loop, the refrigerant loop comprising a compressor driven by a motor, an air-cooled condenser arrangement having at least one coil and an evaporator arrangement connected in a first closed refrigerant loop, the power/control panel comprising a substantially closed enclosure having a plurality of components therein; the enclosure being in fluid communication with the at least one coil of the air-cooled condenser arrangement, the fluid communication with the enclosure being separate and independent from the first closed refrigerant loop.

18. The power/control panel of claim 17 wherein the fluid communication with the at least one coil of the air-cooled condenser arrangement is configured to substantially prevent formation of condensation inside the power/control panel.

* * * * *

UNITED STATES PATENT AND TRADEMARK OFFICE
CERTIFICATE OF CORRECTION

| | | |
|---|---|---|
| PATENT NO. | : 7,003,971 B2 | Page 1 of 1 |
| APPLICATION NO. | : 10/822640 | |
| DATED | : February 28, 2006 | |
| INVENTOR(S) | : Kester et al. | |

It is certified that error appears in the above-identified patent and that said Letters Patent is hereby corrected as shown below:

In column 9, line 30 "panel s disposed" should be -- panel is disposed --.

In column 10, line 8 "lowest, portion" should be -- lowest portion --.

Delete Claim 8

In column 10, line 4 "claim 8" should be -- claim 1 --.

In column 10, line 7 "claim 8" should be -- claim 1 --.

Signed and Sealed this

Nineteenth Day of September, 2006

JON W. DUDAS
*Director of the United States Patent and Trademark Office*

UNITED STATES PATENT AND TRADEMARK OFFICE
CERTIFICATE OF CORRECTION

PATENT NO. : 7,003,971 B2  Page 1 of 1
APPLICATION NO. : 10/822460
DATED : February 28, 2006
INVENTOR(S) : Kester et al.

It is certified that error appears in the above-identified patent and that said Letters Patent is hereby corrected as shown below:

In column 9, line 30 "panel s disposed" should be -- panel is disposed --.

In column 10, line 8 "lowest, portion" should be -- lowest portion --.

Delete Claim 8

In column 10, line 4 "claim 8" should be -- claim 1 --.

In column 10, line 7 "claim 8" should be -- claim 1 --.

This certificate supersedes Certificate of Correction issued September 19, 2006.

Signed and Sealed this

Twenty-fourth Day of October, 2006

JON W. DUDAS
*Director of the United States Patent and Trademark Office*